United States Patent [19]

Leifer et al.

[11] Patent Number: 5,239,820
[45] Date of Patent: Aug. 31, 1993

[54] ELECTRIC PROPULSION USING $C_{60}$ MOLECULES

[75] Inventors: Stephanie D. Leifer, Pasadena; Winston A. Saunders, So. Pasadena, both of Calif.

[73] Assignee: California Institute of Technology, Pasadena, Calif.

[21] Appl. No.: 985,435

[22] Filed: Dec. 3, 1992

Related U.S. Application Data

[63] Continuation of Ser. No. 793,637, Nov. 18, 1991, abandoned.

[51] Int. Cl.[5] .............................................. F03H 1/00
[52] U.S. Cl. .......................................... 60/202; 60/204
[58] Field of Search ................ 60/200.1, 202, 203.1, 60/204, 253; 315/111.01

[56] References Cited

U.S. PATENT DOCUMENTS

| | | | |
|---|---|---|---|
| 3,555,823 | 1/1971 | Guman | 60/202 |
| 3,898,798 | 8/1975 | Williams | 60/203.1 |
| 5,114,477 | 5/1992 | Mort et al. | 106/472 |
| 5,132,105 | 7/1992 | Remo | 423/445 |

*Primary Examiner*—Louis J. Casaregola
*Attorney, Agent, or Firm*—Norman E. Brunell

[57] ABSTRACT

Fullerene propellants, which are stable carbon cage structures composed of even numbers of carbon atoms in the range of about 32 to 200 atoms, particularly a combination of conveniently obtainable $C_{60}$ and $C_{70}$, may be carried in solid form in a spacecraft, sublimated to produce the appropriate molecular propellant such as $C_{60}$ or $C_{70}$, which may then be ionized by DC discharge or RF radiation to efficiently produce specific impulses in the range above 1000 lbf -s/lbm.

20 Claims, 1 Drawing Sheet

ELECTRIC PROPULSION USING $C_{60}$ MOLECULES

ORIGIN OF THE INVENTION

The invention described herein was made in the performance of work under a NASA contract, and is subject to the provisions of Public Law 96-517 (35 USC 202) in Which the Contractor has elected to retain title.

This is a continuation of copending application Ser. No. 07/793,637 filed on Nov. 18, 1991, now abandoned.

BACKGROUND OF THE INVENTION

1. Field of the Invention

The present invention relates to electrostatic propulsion engines and, in particular, to electric propulsion thrusters used in spacecraft.

2. Description of the Prior Art

Ion propulsion and arcjet systems have been proposed and tested for many years to provide propulsion and control in the near vacuum environment of space by use of the simple action-reaction result of thrusting material out in one direction to cause motion in the other direction. Although various propulsion systems have achieved success for various types of missions, there is a gap in propulsion capability for certain missions such as orbit transfer missions, and North-South station keeping for geosynchronous satellites, where relatively high propellant exhaust velocities (relative to chemical propulsion) are required at higher propulsion system efficiencies than are available with conventional ion engines or arcjets.

Conventional ion propulsion engines use ions of relatively heavy elements, such as xenon, because thruster efficiency is known to increase with the use of heavy ions. In addition, heavier propellants allow for the development of thrusters which can operate at high thrust densities in combination with high power levels which would be prohibitive for lighter propellants. Cluster ion propulsion, using ionized clusters bound primarily by van der Waals forces, has been investigated since the 1960's in attempts to address the thruster efficiency performance problems at moderate exhaust velocities by providing propellants heavier than would otherwise be available. The theoretical advantages of using a clustered propellant arise from the decreased cost of ion production for the same mass flux through a thruster that could be achieved with a monatomic propellant.

However, satisfactory propellants for use in such systems must have a relatively narrow, preferably monodisperse, mass distribution and a high resistance to fragmentation to minimize efficiency loss. In addition, large quantities of the propellant must conveniently be made available on board the spacecraft when required for use. Convenient propellants providing high thruster efficiencies and narrow charge-to-mass ratios suitable for use in ion propulsion systems have not yet been suitably identified.

The conventional approach to cluster ion propulsion systems utilized various methods for producing and ionizing such clusters in the propulsion system itself. These methods include condensing clusters from a supersaturated gas stream in supersonic expansion followed by subsequent ionization by either electron bombardment or electron attachment.

Ion nucleation, in which some of the atoms in the gas flow are ionized to serve as nucleation centers, was also studied and proposed as a way to improve ion-engine performance. This approach does improve ion production efficiency and eliminates the problems of cluster fragmentation. However, the method produces a broad range of cluster sizes so that theoretical advantages of cluster ion propulsion are not fully realized in practice.

What is needed is a convenient and inexpensive technique for producing and storing preformed heavy ion propellant with near monochromatic mass distribution and reduced tendency to fragment which can be used to provide increased thruster efficiency at moderate exhaust velocities in ion propulsion systems.

SUMMARY OF THE INVENTION

The preceding and other shortcomings of the prior art are addressed and overcome by the present invention that provides, in a first aspect, an ion propulsion engine using sublimated solid form fullerene, particularly a stable carbon structure having even numbers of carbon atoms in the range of above about 32 atoms, such pure $C_{60}$, pure $C_{70}$ or a mixture thereof as a propellant. The fullerene may have an attached or included atom of another element, such as U@$C_{70}$, a Uranium atom incorporated in a $C_{70}$ cage. The propellant may be selectively sublimated from the solid form at a selected temperature and pressure, and ionized by DC or RF discharge or other known methods of ionization.

In another aspect, the invention provides a method of generating ion propulsion for a space vehicle by providing a quantity of fullerenes in solid form in the space vehicle, sublimating the fullerenes, ionizing the sublimated fullerene, and discharging the ionized sublimated fullerene for propulsion.

In another aspect, the invention provides an ion propulsion engine including a quantity of fullerenes in solid form, a sublimation chamber for sublimating the fullerenes, means for ionizing the sublimated fullerene, and means for discharging the ionized sublimated fullerene for propulsion.

The foregoing and additional features and advantages of this invention will become further apparent from the detailed description and accompanying drawing figures that follow. In the figures and written description, numerals indicate the various features of the invention, like numerals referring to like features throughout both the drawing figures and the written description.

DETAILED DESCRIPTION OF THE PREFERRED EMBODIMENT

Figure 1:
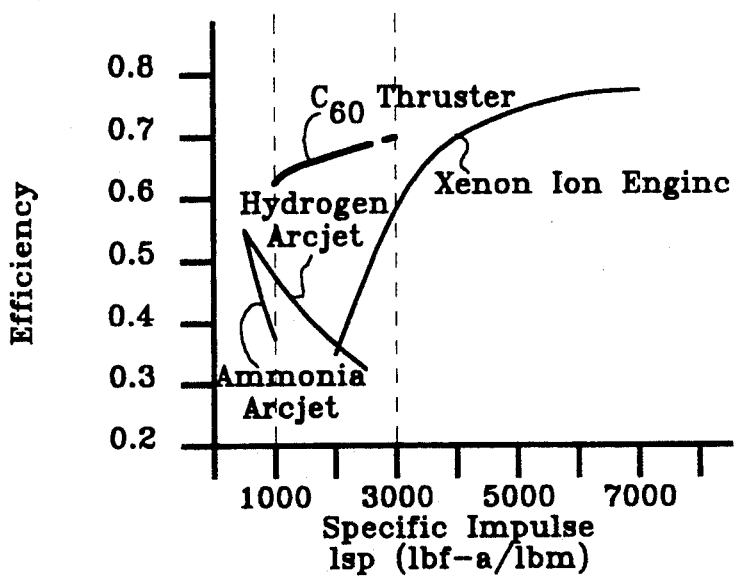
FIG. 1 is a graphical representation showing the approximate thruster efficiency of an ion propulsion engine using $C_{60}$ propellant according to the instant invention in comparison with several conventional propulsion engines.

Referring now to FIG. 1, the approximate thruster efficiency of an ion propulsion engine using $C_{60}$ propellant according to the instant invention is shown as a function of specific impulse in the 1000 to 3000 lbf-s/lbm specific impulse range required, for example, for orbit transfer missions.

For comparison purposes, the efficiency of conventional xenon ion engines and hydrogen and ammonia arcjet propulsion systems are shown on the same scale. As is clearly identifiably shown in this graph, the efficiencies of the arcjet systems peak below this specific impulse range, while the efficiency of the xenon engine peaks above this range. The efficiency of an ion propulsion engine using $C_{60}$ propellant according to the instant invention is substantially higher than either the arcjet or xenon ion propulsion engines in this particular range.

Figure 2:
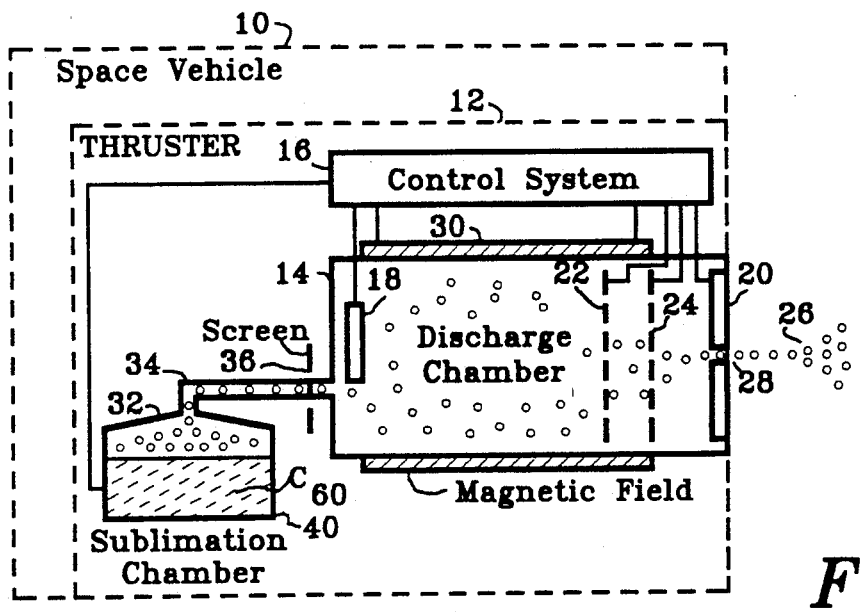
FIG. 2 is a block diagram of an ion propulsion engine using a fullerene propellant ionized by DC discharge according to the instant invention.

Referring now to FIG. 2, space vehicle 10 may include one or more fullerene propellant thruster engines 12 in accordance with the present invention for producing thrust for positioning, stabilizing or similar space vehicle propulsion requirements. Thruster engines 12 will be described for convenience with $C_{60}$ propellant although other stable carbon structures and mixtures thereof may be used as will be described below. $C_{60}$ thruster engines 12 includes discharge chamber 14 operated under the control of control system 16 generally in accordance with known techniques for ion propulsion engines.

In particular, in the DC voltage discharge ionization engine shown in FIG. 2, control system 16 applies the appropriate DC voltages to cathode 18, anode 20, and screen and accelerator grids 22 and 24 in discharge chamber 14 to ionize and accelerate fullerene ions 26 out of port 28 under the influence of a magnetic field applied by solenoid windings or permanent magnets 30. Ions 26 in accordance with the present invention are created from molecular $C_{60}$ 38 produced in sublimation chamber 32 and applied to discharge chamber 14 via conduit 34 through mesh screen 36.

In sublimation chamber 32, free molecular $C_{60}$ 38 may be selectively produced by heating solid form $C_{60}$ 40 to sublimation at a temperature on the order of about 350° C. at a pressure of about 1 Torr. After passing through fine mesh screen 36 in conduit 34, molecular $C_{60}$ 38 is ionized to become $C_{60}$ ions 26 by DC discharge, or alternatively by other means described in greater detail below with regard to FIG. 3.

$C_{60}$, known as buckminsterfullerene in honor of the developer of the geodesic dome which it is said to resemble, is an allotrope of carbon. $C_{60}$ is one of the even numbered stable carbon structures known as fullerenes. Fullerene ions in general, and $C_{60}$ ions in particular, provide special advantages for use in ion propulsion systems because they provide increased propulsion system efficiency, especially in the critical 1000 to 3000 lbf-s/lbm specific impulse range. This improvement results in part from a decreased power requirement for ionization. In addition, they have an extremely low tendency to fragment and may have a low rate of erosion of surfaces they impact.

$C_{60}$ is conveniently storable on board space vehicle 10 so that preformed clusters, available by sublimation from a solid form of the material, may be used.

The formation of $C_{60}$ from the vaporization of graphite has been well demonstrated. $C_{60}$ has a molecular mass of 720 amu, is extremely stable, can be easily produced and is electrically insulating when deposited. Only a small incidence of fragmentation of diatomic carbon from the molecule is believed to occur during ionization. The ionization potential of $C_{60}$ is only about 7.5 eV, well below that of Xe (12.1 eV).

One measure of the relative advantages of $C_{60}$ thruster engine 12 over a conventional xenon ion propulsion engine is the difference in energy required to produce one $C_{60}$ ion in the exhaust plume through port 28 compared to that required to produce one xenon ion in similar circumstances.

The average energy, $\epsilon_B$, required to produce an ion expelled in the exhaust plume may be determined in accordance with equation (1), as follows:

$$\epsilon_B = \frac{\epsilon_p^*}{f_B[1 - e^{-C_0 m(1-n\mu)}]} + \frac{f_C V_D}{f_B} \qquad (1)$$

where $f_B$ is the fraction of ions extracted from the plasma in discharge chamber 14, $f_C$ is the fraction of ion current to cathode 18, $V_D$ is the discharge voltage at anode 20, $C_O$ is the primary electron utilization factor, m is the propellant flow rate, and $n_\mu$ is the propellant utilization efficiency.

The factor $\epsilon_p^*$ is called the baseline plasma ion energy cost and can be defined as:

$$\epsilon_p^* = \frac{\epsilon_0 + \epsilon_M}{1 - \frac{V_C + \epsilon_M}{V_D}} \qquad (2)$$

where $\epsilon_0$ is the average energy lost to ionization and excitation, $\epsilon_M$ is the average energy of Maxwellian electrons reaching anode 20 and $V_C$ is the plasma potential from which electrons emitted at cathode 18 are accelerated. The ion energy cost is an important figure of merit for an ion propulsion system because energy used to create ions cannot be recovered.

$C_O$ is the primary electron utilization factor and reflects the degree of interaction between neutral particles and primary electrons, that is, electrons emitted by cathode 18 which have not yet undergone a collision. Large values of $C_O$ are desirable because they reflect more efficient ion production. $C_O$ is proportional to the total collision cross section and inversely proportional to the velocity of the neutral propellant particles. At a fixed temperature, the velocity of the neutral particles is given by $$V = \sqrt{\frac{2K_B T}{\pi M}} \qquad (3)$$

where T is the temperature, $K_B$ is Boltzmann's constant, and M is the mass of the particle. The ratio of the velocities of $C_{60}$ ions 26 to xenon atoms is on the order of 0.43. The radius of a xenon atom is about 2.2 Å while the radius of a $C_{60}$ molecule is about 3.5Å. Assuming that the collision cross section is proportional to the square of the neutral particle radius, the collision cross section of $C_{60}$ ions 26 are Hence, the primary utilization factor, $C_O$, is expected to be about 6 times greater for $C_{60}$ than for Xe.

Although accurate values for the baseline plasma ion energy cost $\epsilon_p^*$ are not presently available, the value of $\epsilon_p^*$ for $C_{60}$ is expected to be less than that for xenon because the ionization potential of $C_{60}$ is lower than for xenon, and therefore the discharge voltage need not be as high. These factors will contribute to lower values of $\epsilon_O$, $\epsilon_M$ and $V_D$.

Using typical values of these variables for xenon of M=1000 mA, $f_B$=0.6, $f_C$=0.1, $V_D$=50 V, $C_O$=3.0 $A^{-1}$ and $\epsilon_p^*$=50 volts, the approximate energy cost per xenon beam ion is on the order of about 190 eV for a propellant utilization efficiency, $n_\mu$=0.8. Approximating the energy cost for a $C_{60}$ beam ion based on the primary electron utilization factor calculated above, the energy cost per $C_{60}$ ion would be about 90 eV for the same propellant utilization efficiency. This implies that the energy cost per atomic mass unit for $C_{60}$ is about 8.6 percent of that for Xe. In addition, the lower diffusivity of $C_{60}$ would lead to improvements of the utilization efficiency, $n_\mu$, further improving the performance of $C_{60}$ relative to Xe.

The improved ion engine efficiency at low specific impulse may be understood from the following relation:

$$\eta = \frac{\gamma^2 \eta_\mu}{1 + \frac{2e}{m_i}\left(\frac{\gamma \eta_\mu}{gI_{sp}}\right)^2 (\epsilon_B + V_{nc})} \tag{4}$$

where $\gamma$ is the thrust loss factor due to beam divergence and double ionization, $n_\mu$ is the propellant utilization efficiency, $m_i$ is the ion mass, $I_{sp}$ is the specific impulse, and $V_{nc}$ is the neutralizer coupling voltage. For a xenon ion engine operating at 1500 lbf-s/lbm and an ion production cost of 190 eV per ion, the efficiency would be approximately 40%.

However, for $C_{60}$ thruster engine 12, the higher accelerating voltage and lower ion product costs improves the efficiency to be on the order of about 67% for the same specific impulse of 1500 lbf-s/lbm. The efficiency of $C_{60}$ thruster engine 12 for specific impulses in the range between 1000 and 3000 lbf-s/lbm is shown in FIG. 1 for comparison with the efficiencies of conventional xenon propulsion engines and mercury and ammonia arcjets.

In addition to providing improvements in thruster power efficiency in this range, the use of $C_{60}$ ions 26 as a propellant may result in increased lifetime for $C_{60}$ thruster engine 12. Preliminary studies in which $C_{60}$ ions were accelerated to high velocities in the range of about 6700 meters per second into various barriers, such as stainless steel and silicon barriers, provided no evidence of sputter or erosion of the barrier surfaces. This indicates that $C_{60}$ molecules may at least partially absorb the collision energy and therefore cause less erosion damage in $C_{60}$ thruster engines 12 than would otherwise be predicted.

In addition, the larger mass of fullerenes such as $C_{60}$ when compared to conventional atomic propellants such a xenon result in the requirement for lower discharge currents to achieve the same mass flux through the accelerator grids and therefore may improve thruster lifetimes as a result of the reduced demands on the cathode.

In addition to the pure $C_{60}$ indicated as solid form $C_{60}$ 40 in FIG. 2, it may be convenient to utilize other fullerenes as propellants including other of the so-called stable carbon cage structure fullerenes having even numbers of carbon atoms in the range of 60 to 200. In particular, combinations or mixtures of different mass number fullerenes may be attractive for economic or other mission specific reasons. The conventional techniques for creating and collecting carbon cage structures often provide high concentrations of one particular structure in combination with lower concentrations of one or more other mass number structures.

Processes for producing $C_{60}$ often produce $C_{60}$ in the presence of $C_{70}$ in ratios in the range of about 60:40 to 80:20 of $C_{60}$ to $C_{70}$. Further concentrating the $C_{60}$ to exclude the $C_{70}$ may prove to be more expensive than required because $C_{60}$ molecules may more conveniently be separated from other carbon cage structures during selective sublimation as a result of the differences in the sublimation temperature. That is, a convenient and relatively inexpensive mixture of about 80:20 $C_{60}$ to $C_{70}$ may be used as solid form $C_{60}$ 40 in $C_{60}$ thruster engines 12 while sublimation at 350° C. at a pressure of 1 Torr causes primarily $C_{60}$ to sublimate therefrom.

Figure 3:
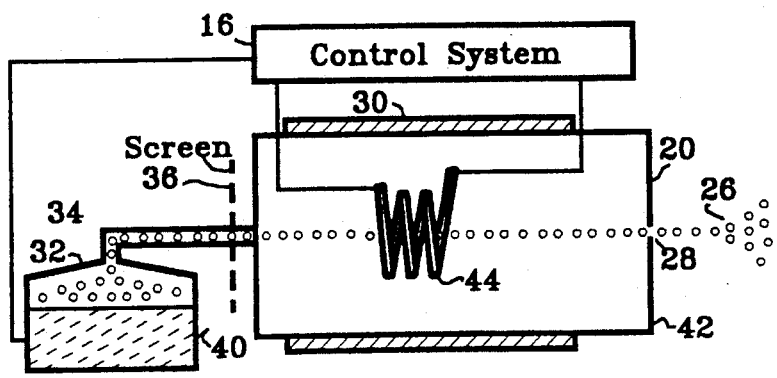
FIG. 3 is a block diagram of an ion propulsion engine using a fullerene propellant ionized by RF discharge according to the instant invention.

Referring now to FIG. 3, ionization is provided in discharge chamber 42 by RF radiation antenna 44 under the control of control system 16. $C_{60}$ is not electrically conducting and may plate onto electrodes, such as cathode 18 and anode 20 shown in FIG. 1, to form an insulating coating. This insulation would tend to reduce the efficiency of $C_{60}$ thruster engine 12 as shown in FIG. 1 because the ionization of ions 26 by DC discharge requires cathode 18 to be able to emit electrons. A layer of non-conducting $C_{60}$ would make it more difficult for cathode 18 to emit electrons. An RF ionization approach, as shown in FIG. 3, is not substantially hampered by the coating of RF radiation antenna 44 with a layer of insulation.

While this invention has been described with reference to its presently preferred embodiments, its scope is not limited thereto. Rather, such scope is only limited in so far as defined by the following set of claims and includes all equivalents thereof.

What is claimed is:

1. An ion propulsion engine, comprising:
   a quantity of fullerene in solid form;
   a sublimation chamber for sublimating the fullerene,
   means for ionizing the sublimated fullerene; and
   means for discharging the ionized sublimated fullerene for propulsion.

2. The ion propulsion engine claimed in claim 1 wherein the fullerene further comprise:
   stable carbon structures having even numbers of carbon atoms in the range of 60 to 200.

3. The ion propulsion engine claimed in claim 2 wherein the stable carbon structures further comprise: $C_{60}$.

4. The ion propulsion engine claimed in claim 2 wherein the stable carbon structures further comprise:
   a mixture primarily of $C_{60}$ and $C_{70}$.

5. The ion propulsion engine claimed in claim 4 wherein the sublimation chamber further comprises:
   means for selectively sublimating $C_{60}$ in preference to other fullerenes.

6. The ion propulsion engine claimed in claim 2 wherein the stable carbon structures further comprise: $C_7$.

7. The ion propulsion engine claimed in claim 2 wherein the stable carbon structures further comprise:
   a fullerene cage with an atom incorporated therein.

8. The ion propulsion engine claimed in claim 1 wherein the means for ionizing the sublimated fullerene further comprises:
   a cathode;
   an anode; and
   means for applying a DC voltage therebetween.

9. The ion propulsion engine claimed in claim 1 wherein the means for ionizing the sublimated fullerene further comprises:
   means for applying an RF discharge to the sublimated fullerene.

10. The ion propulsion engine claimed in claim 1 wherein the means for discharging the ionized sublimated fullerene for propulsion further comprises:

means for providing propulsion in the range of above about 1000 lbf-s/lbm.

11. A method of generating ion propulsion for a space vehicle, comprising the steps of:

providing a quantity of fullerene in solid form in the space vehicle;

sublimating the fullerene, ionizing the sublimated fullerene; and discharging the ionized sublimated fullerene for propulsion.

12. The method of generating ion propulsion claimed in claim 11 wherein the fullerene are stable carbon structures having even numbers of carbon atoms in the range of 60 to 200.

13. The method of generating ion propulsion claimed in claim 12 wherein the stable carbon structures are primarily $C_{60}$.

14. The method of generating ion propulsion claimed in claim 12 wherein the stable carbon structures are a mixture of $C_{60}$ and $C_{70}$.

15. The method of generating ion propulsion claimed in claim 14 wherein the step of sublimating the fullerene further comprises:

selectively sublimating $C_{60}$ in preference to $C_{70}$.

16. The method of generating ion propulsion claimed in claim 12 wherein the stable carbon structures are primarily $C_{70}$.

17. The method of generating ion propulsion claimed in claim 12 wherein the stable carbon structures include fullerene cages incorporating other atoms.

18. The method of generating ion propulsion claimed in claim 11 wherein the step of ionizing the sublimated fullerene further comprises:

applying a DC voltage discharge to the sublimated fullerene.

19. The method of generating ion propulsion claimed in claim 11 wherein the step of ionizing the sublimated fullerene further comprises:

applying an RF discharge to the sublimated fullerene.

20. The method of generating ion propulsion claimed in claim 11 wherein the step of discharging the ionized sublimated fullerene provides propulsion in the range above about 1000 lbf-s/lbm.

* * * * *